United States Patent [19]

Heyraud

[11] Patent Number: 4,864,841

[45] Date of Patent: Sep. 12, 1989

[54] ELECTRONIC TORQUE WRENCH

[75] Inventor: Georges Heyraud, St Just Malmont, France

[73] Assignee: Sam Outillage, Loire, France

[21] Appl. No.: 199,877

[22] Filed: May 27, 1988

[30] Foreign Application Priority Data

May 27, 1987 [FR] France ................................ 87 07833

[51] Int. Cl.[4] ........................ G01L 25/00; B25B 23/142

[52] U.S. Cl. ..................................... 73/1 C; 73/862.26

[58] Field of Search ..................... 73/1 B, 1 C, 862.23, 73/862.26, 862.35, 862.67

[56] References Cited

U.S. PATENT DOCUMENTS 3,970,155 7/1976 Otto .
3,995,477 12/1976 Almond .
4,006,629 2/1977 Barrett et al. .

FOREIGN PATENT DOCUMENTS 0100023 2/1984 European Pat. Off. .
0172119 2/1986 European Pat. Off. .
0172120 2/1986 European Pat. Off. .
3139374 4/1983 Fed. Rep. of Germany .
2242202 3/1975 France .
2538741 7/1984 France .

OTHER PUBLICATIONS

The Strain Gage Primer-McGraw-Hill Book Co., 2nd Ed., Perry & Lissiner, pp. 230-232.

*Primary Examiner*—Charles A. Ruehl
*Attorney, Agent, or Firm*—Browdy and Neimark

[57] ABSTRACT

An electronic torque wrench equipped with at least two strain gages placed on both sides of a crosswise plane on a part forming a sensor and each supplying an output voltage, $C_1$ and $C_2$ respectively, which, depending on torque C applied by the wrench to an actuation point A, reacts on an electronic circuit indicating this torque. The wrench comprises a first electronic circuit for determining and storing a constant factor k during a calibration measurement for which torque C is applied at actuation point A is made zero by a parasitic force F' applied in the opposite direction of actuation force F and at a point E of the wrench other than point B of application of the latter force F, the constant factor k being used during each use of the wrench by the electronic circuit to determine, with second circuit and by application of the formula $C=C_1+k(C_1-C_2)$, the value of torque C applied to actuation point A as a function of torques $C_1$ and $C_2$ actually measured respectively by the at least two strain gages.

6 Claims, 4 Drawing Sheets

ELECTRONIC TORQUE WRENCH

BACKGROUND OF THE INVENTION

1. Field of the Invention

This invention relates to an electronic torque wrench equipped with strain gages placed on a part forming a sensor and supplying an output voltage which, depending on the torque exerted on the wrench, reacts on electronic means indicating this torque.

2. The Prior Art

In accompanying FIG. 1, which partially and very diagrammatically represents an electronic torque wrench of this type, 1 is the part forming the sensor, 2 the hollow handle closed by a removable plug 3, and 4 the electronic measuring and display circuit which is associated with strain gages 5, 6 placed on sensing part 1 on both sides of crosswise plane 7. Such a wrench is, for example, structurally such as described in document FR-A-2 568 009. In the drawing, the removable driving head, which fits on part 1 to exert the rotation torque at point A, is not represented.

Under normal conditions of using this wrench, the operator, to apply a rotation torque at A, exerts a force F at determined point B of the wrench. The torque actually measured by the strain gages 5 and 6 is then bending torque C' at point D which is located at an axial distance L' from the point of application of force F. Torque C is deduced from measured torque C' by the relation:

$$C = C' \cdot (L/L')$$

In case the operator applies force F at a point B' of handle 2 which, for example, is closer to point A by an axial distance x, the torque displayed by the wrench will be equal to the torque measured at D, multiplied by the preceding factor L/L', since the electronic measuring and display circuits contained in 4 are consequently adjusted. This measurement is inexact since in reality, the torque which should be displayed should be equal to the torque actually measured by gages 5 and 6, multiplied by the factor $(L-x)/(L'-x)$ and not by the factor L/L'.

There has been shown in accompanying FIG. 2 another case of poor use of this wrench. In this case, the operator applies, besides force F directed downwardly and applied at point B with four fingers but not the thumb, a parasitic force F' equal to F but oriented upwardly and located at a point E closer to A. In this case, torque C applied at A is zero and on this point is exerted a tangential displacement force f, applied upwardly. Point A being stationary by definition, the equilibrium of the wrench is reflected by a reaction force R at A, this force being equal and opposite to force f.

At previously defined measuring point D, strain gages 5 and 6 still measure a non-zero bending, so that the value of the torque displayed by the wrench is not zero, yet which should be the case since the actual torque to measure is indeed zero.

In case F is greater than F', there will indeed be an appearance of a torque at A, but the measurement of this torque will be vitiated by a systematic error due to the parasitic bending generated by the application of "parasitic" force F'.

As prior art there can be cited the documents DEA 3139374 and U.S. Pat. No. 4,006,629.

SUMMARY OF THE INVENTION

The invention aims at eliminating these measurement errors due to poor positioning of the hand. It applies to an electronic torque wrench of the type mentioned above, this wrench being equipped with first electronic means to determine and store a constant factor k during a calibration measurement for which torque C applied at actuation point A is made zero by a parasitic force F' applied in the opposite direction and at a point of the wrench other than point B of application of actuation force F. The constant factor is then used each time by an electronic circuit of the wrench to determine, by application of the formula $C = C_1 + k\ (C_1 - C_2)$, the value of torque C applied at the actuation point as a function of torques $C_1$ and $C_2$ actually measured respectively by the gage or gages that are respectively in both sides of the plane where the measurement is actually made by these gages. The electronic circuit of the wrench is equipped with second electronic means then for computing each time, by the preceding formula, the value of torque C as a function of this factor k and of torques $C_1$ and $C_2$ measured by these gages. In the case of analog computing means, the one and same means is involved.

BRIEF DESCRIPTION OF THE DRAWINGS

In any case, the invention will be better understood, and its advantages and other characteristics will come out during the following description of some nonlimiting examples of embodiment in an analog manner, with reference to the accompanying diagrammatic drawings, in which.

DETAILED DESCRIPTION OF THE INVENTION

Figure 2:
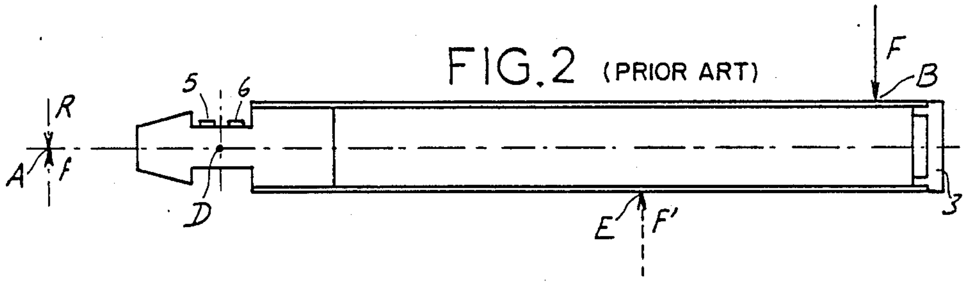
FIG.2 (PRIOR ART)
Figure 3:
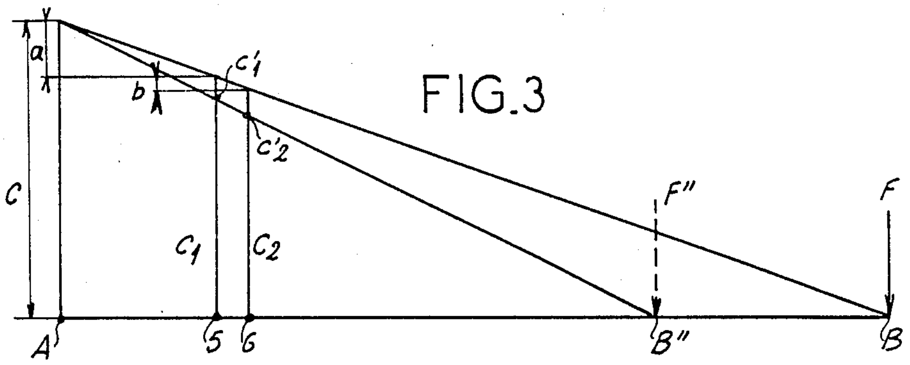
FIG. 3 is an explanatory graph of the measurement of the torque exerted by the wrench, the force being applied at a first point than at a second point of the wrench.

On the graph of FIG. 3 are plotted, from point A where the rotation torque is exerted, along the x-axis the different points of the longitudinal axis of the torque wrench and along the y-axis the different values of torques at these points. The wrench is assumed to be equipped with a sensor comprising the two gages 5 and 6 of FIGS. 1 and 2 described above, and the graph of FIG. 3 is only a diagram of the bending moments.

If a force F is exerted upward ay a point B located at the end of the wrench, it generates at A a torque of value C. Strain gages 5 and 6 measure bending torque $C_1$ and $C_2$ respectively.

If in FIG. 3 the segments are considered:

$a=C-C_1$ on vertical C and $b=C_1-C_2$ on vertical $C_1$, application of the Thales' theorem gives:

$$a=k \cdot b$$

or $C=C_1+k(C_1-C_2)$, this relation being verified always for the same value of factor k, regardless of the position of force F. For example, for a force F'' applied at B'' to create at A the same torque C, there will be a relation of the form:

$$C=C'_1+k(C'_1-C'_2).$$

The invention is based on the finding that the determination of factor k makes it possible finally to compute the value of C as a function of the measured values $C_1$ and $C_2$, regardless of the point of application of force F.

Figure 4:
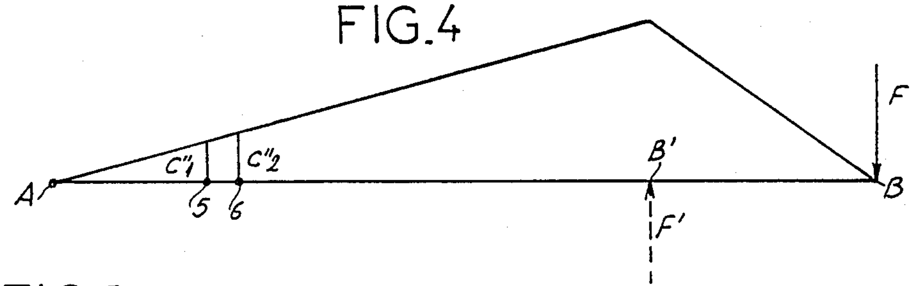
FIG. 4 is a graph similar to the preceding one, but showing the test operation for determining factor k.

The diagram of FIG. 4 has the object of showing the principle of determination, once for all, for the wrench considered, of this factor k.

To perform this calibration operation, the exact conditions of FIG. 2 described above are used: an active force F is applied at B, while a parasitic force F' is applied at E to create a zero torque at A. Gages 5 and 6 still measure bending torques $C''_1$ and $C''_2$.

The above relation: $C=C_1+k(C_1-C_2)$ gives in this case where torque C is zero:

$$0=C''_1+k(C''_1-C''_2)$$

hence: $k=C''_1/(C''_2-C''_1)$.

According to the invention, this value of k is computed and stored, by analog and/or digital means, from the measurement of $C''_1$ and $C''_2$ during this calibration operation, then after which all the measurements which will follow from torque C applied by the wrench at point A will be made by an analog and/or digital computation of this torque by application of the formula;

$$C=C_1+k(C_1-C_2)$$

or a formula derived from it, for example, by factoring one or more elements.

Figure 5:
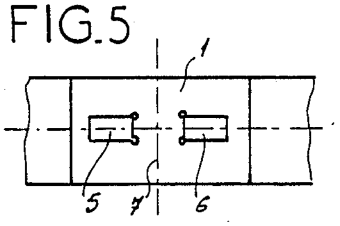
FIG. 5 is a top view of a sensor with two strain gages.
Figure 6:
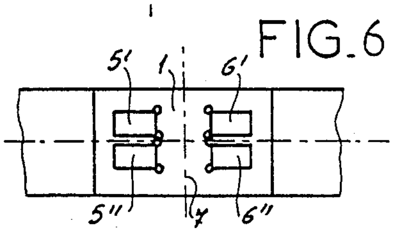
FIG. 6 is a top view of a two-torque sensor with strain gages.

FIGS. 5 to 8, to which reference is now made, give a first practical embodiment of this wrench. FIGS. 5 and 6 show that this wrench can, for example, be equipped with a bending sensor 1 comprising two strain gages 5 and 6 located on both sides of median crosswise plane 7, or comprising, to obtain a greater sensitivity, two pairs, 5'5'' and 6'6'' respectively of stress gages, respectively in series (5' is in series with 5'', and 6' is in series with 6'').

Figure 7:
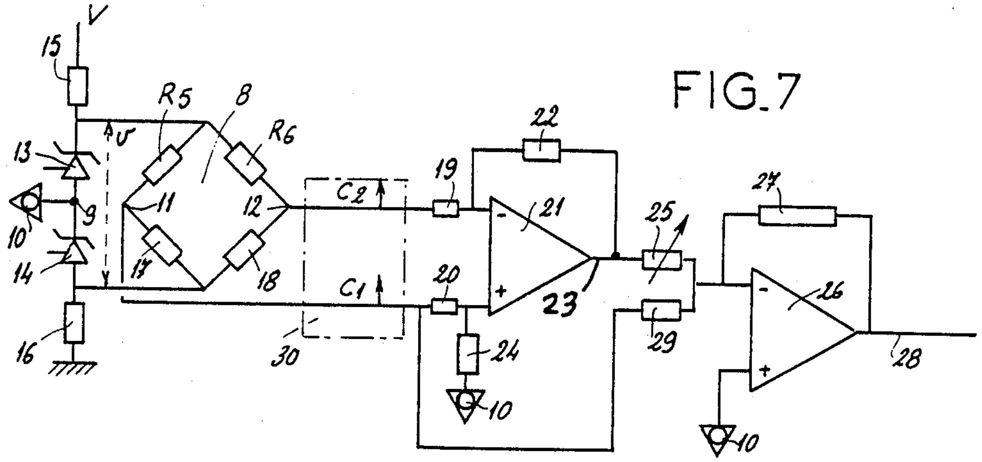
FIG. 7 is an electrical diagram of a first electric circuit for measuring and computing the torque which forms the input circuit of the electronic circuit of this wrench.

The device which uses the invention is the input circuit of electronic card 4 which is placed in the handle of the wrench. This input circuit is represented in FIG. 7, and there an analog use of the invention is involved.

Strain gages 5 and 6 are represented by their ohmic resistances $R_5$ and $R_6$, and are placed, in a very standard way, in the two adjacent arms of a Wheatstone bridge 8.

In a way known in the art, bridge 8 is fed by an adjustable stabilized voltage v, which is such that it makes it possible to define, at middle point 9, an analog ground 10 which is at a potential identical with that of each of points 11 and 12 of bridge 8 at the equilibrium of the latter. In this example feeding is achieved by means of two adjustable zener diodes 13, 14 which are connected in series between positive feed terminal V and the ground, by two polarization resistances 15 and 16.

Balancing of bridge 8 is achieved by means of resistances 17 and 18 which are equal respectively to $R_5$ and $R_6$ with no-load, i.e., in the absence of bending.

At equilibrium of the bridge, in the absence of any bending strain on gages 5 and 6, the potentials at 11 and 12 are equal, and their zener diodes 13 and 14 are adjusted so that these potentials are both equal to the potential at point 9 which defines analog ground 10 of the circuit.

When gages 5 and 6 are subjected to a bending strain, their resistances $R_5$ and $R_6$ vary so that bridge 8 is out of equilibrium, and at 11 and 12 voltages appear respectively representative of $C_2$ and $C_1$, previously defined. These two voltages are respectively applied, through resistances 19 and 20, to the input terminals (−) and (+) of an analog differential amplifier 21 made to function as an analog subtractor. The gain of amplifier 21 is equal to 1 and is adjusted by feedback resistance 22, connected between its output terminal 23 and its input terminal (−), while its input terminal (+) is connected to the analog ground by a balancing resistance 24.

On output 23 of this analog subtractor therefore appears a voltage representative of $C_1-C_2$. This voltage is applied, through a manually adjustable input resistance 25 (consisting of a potentiometer), to the input terminal (−) of another differential amplifier 26. This differential amplifier 26, which is connected as an adder, is also equipped with a feedback resistance 27, connected between its output 28 and its input terminal (−). Resistance 27 in this example is adjusted to give to this stage a gain equal to 1. Quite obviously, it could be adjusted to give it a gain greater than 1 in a supplementary aim of amplification of the signal.

Input terminal (−) of differential amplifier 26 further receives, through an input resistance 29 of fixed value, the voltage representative of $C_1$ which appears at 11.

Terminal (−) of differential amplifier 26 being connected directly to the analog ground, the analog voltage which appears at 28 is equal to:

$[-C_1+k\ (C_1-C_2)]$, or the reciprocal of C, where k is equal to the ratio of the values of resistances 25 and 29 (the resistance of 25 is equal to k times the resistance of 29). Therefore at 28 a voltage representative of torque C, except for the sign, is obtained.

Constant factor k is determined by adjustment of potentiometer 25 during the calibration operation which was previously defined in reference to FIG. 4. To be able to proceed with this adjustment, this potentiometer 25 is mounted on electronic card 4 to be accessible by adjustment screwdriver, for example, after end plug 3 of the wrench had been removed. Of course, the circuit of FIG. 7 constitutes only an input circuit, and it is followed by amplification and accommodating circuits necessary to permit display of torque C on the screen of a digital display of the wrench.

Figure 8:
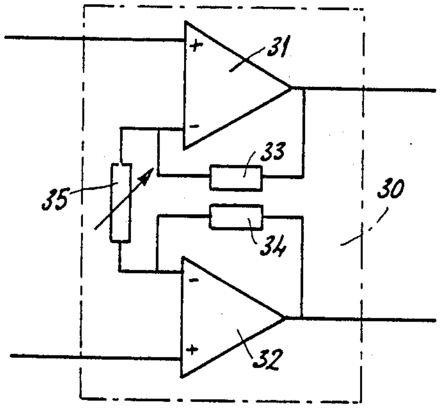
FIG. 8 is a diagram of a portion of a circuit that can be added to the circuit of FIG. 7.

The output signals of Wheatstone bridge 8 are very weak, so that, besides the previously mentioned fact that last stage 26 can also function as an amplifier, it is possible to introduce, between outputs 11, 12 of bridge 8 and input resistances 19, 20 of stage 21, an amplification stage 30, represented in detail in FIG. 8 and known in the art in the instrumentation field.

This stage 30 comprises in a standard way two differential amplifiers 31 and 32, one through feedback resistances 33 and 34 respectively, and a potentiometer 35 for adjustment of gain.

Figure 9:
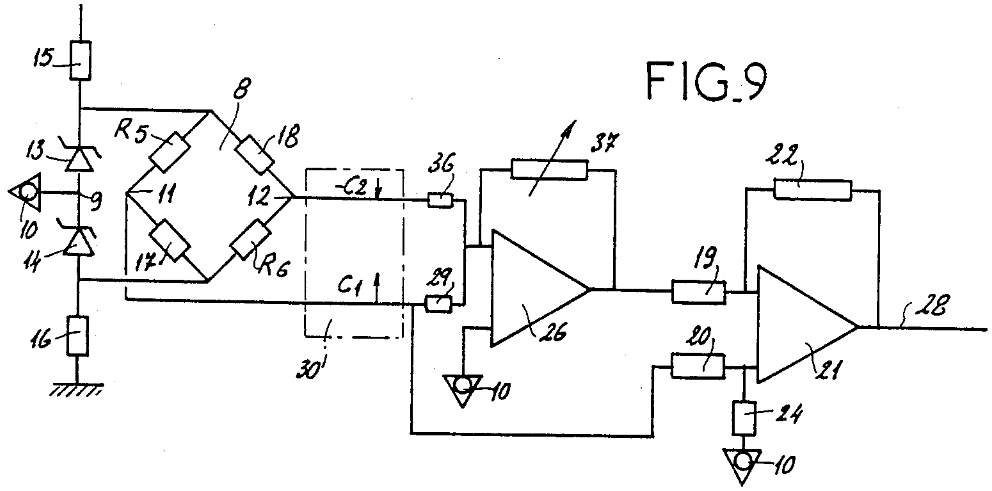
FIG. 9 is a variant of the circuit of FIG. 7.

In the circuit according to FIG. 9, resistance gages $R_5$ and $R_6$ are placed respectively in the two opposite arms of bridge 8. Then at the output terminals 11 and 12 of bridge 8 appear voltages respectively representative of $C_1$ and $-C_2$. In this case, adder stage 26 is placed ahead of subtractor stage 21 but, in regard to stage 26, potentiometer 25 is replaced by a fixed resistance 36 equal to resistance 29 and feedback fixed resistance 27 is replaced by a potentiometer 37 whose value defines for this stage a gain equal to k.

Under these conditions, the output analog voltage of stage 26 is equal to:

$$-k(C_1-C_2)$$

and the voltage on output 28 is equal to:

$$C_1+k(C_1-C_2)=C.$$

There again, according to the invention, the calibration will be performed by adjusting, under the conditions of FIG. 4, the value of potentiometer 4 for displaying torque C to be equal to 0.

In the above, several input circuits have been described which compute, in an analog manner, torque C directly by the formula:

$$C=C_1+k(C_1-C_2)$$

According to another aspect of the invention, it is possible to compute this torque C by the formula:

$$C=C_1(1+k)-k\ C_2$$

which is another way of writing the preceding formula. The latter formula can also be written:

$$C/(1+k)=C_1-k/(1+k)C_2$$

so that, by performing, according to the invention, the calibration operation of FIG. 4 for which torque C is zero, that is to say, $C_1-k/(1+k)\ C_2=0$ it is possible to adjust or determine only one constant equal to:

$$k/(1+k)$$

The latter constant being defined by the calibration operation of FIG. 4, the value actually computed will then be equal each time to:

$$C/(1+k)$$

i.e., the computed value will be equal to C except for another constant equal to:

$$1/(1+k)$$

which actually does not exhibit any drawback in regard to display by the wrench of applied torque C.

Figure 10:
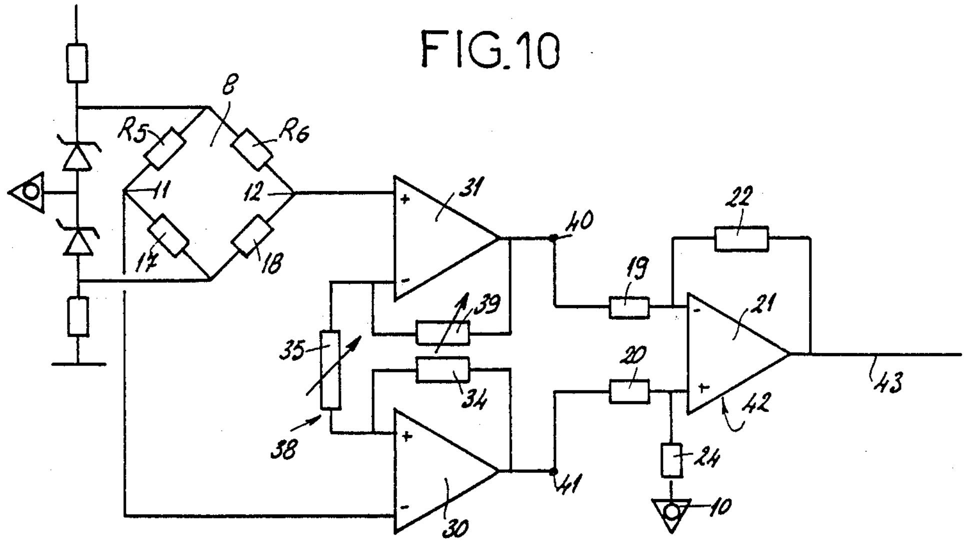
FIG. 10 is an electrical diagram of another example of this input circuit.

FIG. 10 shows a first embodiment of this variation of the invention. Bridge 8 of this input circuit is identical, electrically speaking with that of FIG. 7, so that it carries the same references.

To output terminals 12 and 11 of bridge 8 is connected an amplifier 38 which is practically identical with that of FIG. 8, resistance 33 of the latter, however, being replaced by a manually variable resistance 39, consisting of a potentiometer, and a value that will be adjusted by calibration according to FIG. 4 to:

$$k/(1+k).$$

On the two output terminals 40 and 41 of this stage 38 appear, except for the gain of the stage which will be assumed, for simplification, to be equal to 1, the following respective voltages:

at 40:

$$k/(1+k)\ C_2$$

at 41: $C_1$.

These two voltages are applied to two inputs of a subtractor stage 42, for example identical with that of FIG. 7 (comprising differential amplifier 21).

Therefore on output 43 of this subtractor appears a voltage equal to:

$$C-k/(1+k)C_2$$

i.e.:, $$C/(1+k).$$

Obviously, this solution requires an amplification of the signal to end at C.

Figure 11:
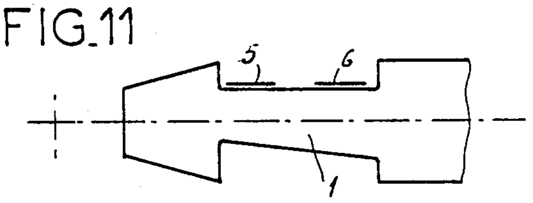
FIG. 11 is a lateral view of the sensor in a particular embodiment of it.
Figure 12:
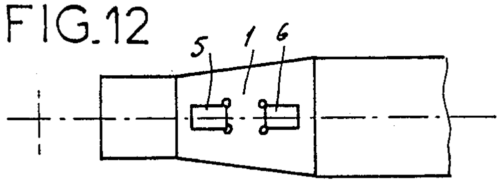
FIG. 12 is a top view of the sensor in another particular embodiment of it.

In all these solutions, and especially in the last one, there will be an advantage in having for $C_1$ a measurement considerably higher than that obtained for $C_2$. This can be obtained either by sufficiently distancing gages 5 and 6 or by making sensor 1 with a moment of inertia less at gage 5 (measurement of $C_1$) than at gage 4 (measurement of $C_2$): for example, in FIG. 11, this is achieved by longitudinal dissymmetry of sensor 1 in the plane of vertical longitudinal section, and in FIG. 12, this is achieved by a longitudinal dissymmetry of this sensor in the plane of longitudinal horizontal section.

Figure 13:
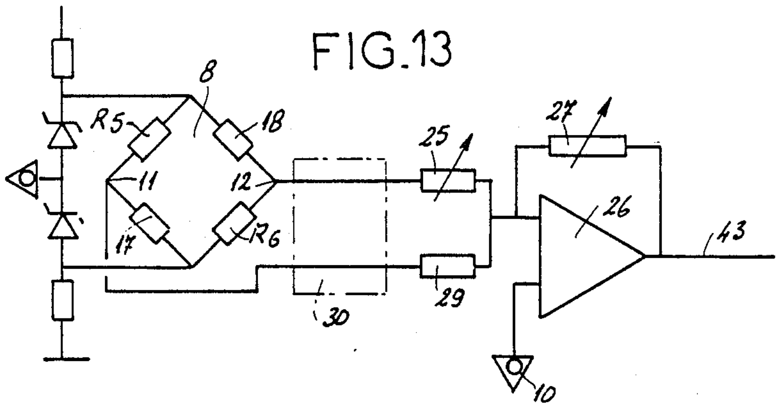
FIG. 13 is a first variant embodiment of the circuit of FIG. 10.

FIG. 13 shows an embodiment which gives the same analog result as circuit FIG. 10, but with resistances $R_5$ and $R_6$in the opposite arms of bridge 8: the achievement of this figure in relation to that of FIG. 10 is what the achievement of FIG. 9 is in relation to that of FIG. 7.

Figure 1:
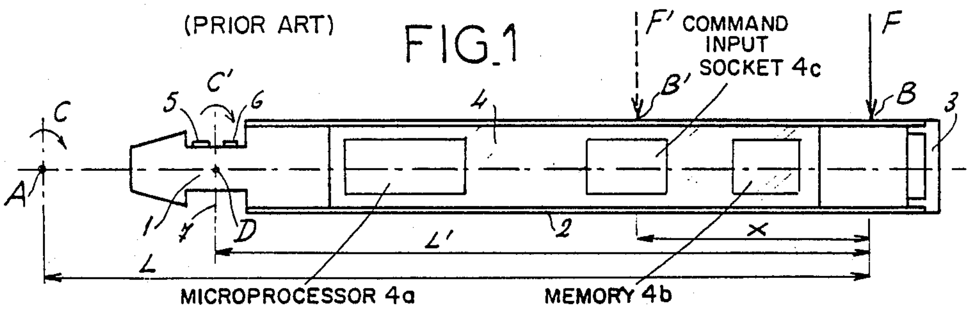
(PRIOR ART) FIG.1
FIGS. 1 and 2 are torque wrenches according to the prior art.

This circuit uses an adder with differential amplifier 26 identical with that of FIG. 1, but the potentiometer 25 adjusted here, by calibration according to FIG. 4, to the value:

$$k/(k+1)$$

so that on output 43 appears, except for the sign, the value $$C_l-k/(k+1)C_2=C/(k+1)$$

as is the case for the circuit of FIG. 10.

Figure 14:
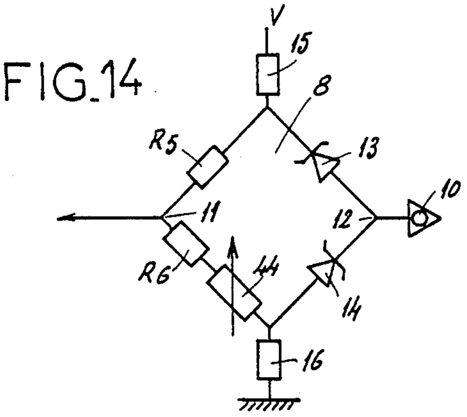
FIG. 14 is another very simplified variant embodiment of an input circuit performing the same function as that of FIG. 10.

FIG. 14 shows a simplified device that directly achieves the preceding equation in bridge 8.

In this bridge, two adjacent arms comprise zener diodes 13 and 14, a third arm comprises resistance $R_5$, while the fourth arm comprises resistance $R_6$, in series with a potentiometric resistance 44 whose value should correspond, after calibration according to FIG. 4, to the value:

$$k/(1+k).$$

Point 12 of the bridge is connected to analog ground 10, while point 11 is the output terminal of the circuit, where a signal appears equal to:

$$C_1-C_2\,k/(1+k)=C/(1+k)$$

The invention is, of course, not limited to the examples of embodiment which have just been described. There is no obligation to proceed in an analog manner, as is the case in all the preceding examples, and it is very possible to achieve the invention with digital means. In this case, electronic card 4 comprises at least one microprocessor **4*a* and one memory 4*b*, and the wrench is equipped with a command input socket 4*c*. Calibration is performed, under the conditions of FIG. 4**, by inputting, during this calibration operation where torque C is zero, an order for computation and storing of constant factor k where k/(k+1). As a result, the microprocessor computes at each measurement the value of torque C by using this value of k, stored for the wrench once and for all.

In all the preceding examples, the calibration also takes into account the design characteristics of the wrench, such as the actual dimensions of the elements within production tolerance ranges, various functional clearances, real moment of inertia of the section carrying the strain gages, sensitivity and characteristics of these gages, and actual positions of these gages depending on the conditions of their gluing to the sensor.

In other words, the electronic means, according to the invention, make it possible to make the wrench with production methods not requiring close tolerances for metallurgical, mechanical and electrical characteristics of its different constitutive elements, without this affecting the final accuracy of the measurement, since it depends solely on calibration of factor k, taking these data into account. The electronic solution considered, simple, compact and able to use present sensors, therefore also leads to a simplification of production and a reduction of production cost and of the final cost of the wrench.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is also understood that the phraseology or terminology employed herein is for the purpose of description and not of limitation.

What is claimed is:

1. An electronic torque wrench equipped with at least two strain gages placed on both sides of a crosswise plane on a part forming a sensor and each supplying an output voltage, $C_1$ and $C_2$ respectively, which, depending on torque C applied by the wrench to an actuation point A, reacts on electronic means indicating this torque, said electronic means determining and storing a constant factor k during a calibration measurement for which the torque C applied at actuation point A is made zero by a parasitic force F' applied in the opposite direction of actuation force F and at a point E of the wrench other than point B of application of the latter force F, said constant factor k being used during each use of the wrench by the electronic means to determine, by application of the formula:

$$C=C_1+k(C_1-C_2),$$

the value of torque C applied to actuation point A as a function of torques $C_1$ and $C_2$ actually measured respectively by the at least two strain gages.

2. The electronic torque wrench according to claim 1, wherein the electronic means comprise means for analog computation of torque C by application of the formula $$C=C_1+k(C_1-C_2).$$

3. The electronic torque wrench according to claim 2, wherein the analog computation means is a circuit equipped with a potentiometric resistance for adjustment to 0 of the indication provided by the wrench when its torque C is made zero by application of parasitic force F'.

4. The electronic torque wrench according to claim 2, wherein an input circuit of the analog computation means consists of a Wheatstone bridge whose two arms respectively comprise said strain gages and whose other two arms comprise resistances of ohmic values respectively equal to predetermined resistances with no-load, such that the Wheatstone bridge is in equilibrium in the absence of torque C.

5. The electronic torque wrench according to claim 1, wherein the electronic means comprise digital computation and storage means, and wherein the wrench is equipped with a command input connection for computation and storage of constant factor k, this command being applied during the calibration measurement.

6. The electronic torque wrench according to claim 1, wherein the sensor and/or the at least two strain gages are adapted to supply voltages which are notably higher for that representative of torque $C_1$ than for that representative of torque $C_2$.

* * * * *